(12) United States Patent
Melendez et al.

(10) Patent No.: US 11,120,694 B2
(45) Date of Patent: Sep. 14, 2021

(54) SYSTEMS AND METHODS FOR PROVIDING THRUST GUIDANCE RELATED TO FLIGHT PATH ANGLE

(71) Applicant: HONEYWELL INTERNATIONAL INC., Morris Plains, NJ (US)

(72) Inventors: Luis Melendez, Scottsdale, AZ (US); Philip Sin, Phoenix, AZ (US); John Koenig, Scottsdale, AZ (US); Michael Mast, Sun City, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 138 days.

(21) Appl. No.: 16/672,096

(22) Filed: Nov. 1, 2019

(65) Prior Publication Data
US 2021/0065558 A1 Mar. 4, 2021

Related U.S. Application Data

(60) Provisional application No. 62/781,785, filed on Dec. 19, 2018.

(51) Int. Cl.
*G08G 5/00* (2006.01)
*G01C 23/00* (2006.01)

(52) U.S. Cl.
CPC ........... *G08G 5/0021* (2013.01); *G01C 23/00* (2013.01); *G08G 5/0034* (2013.01); *G08G 5/0047* (2013.01)

(58) Field of Classification Search
CPC .. G08G 5/0021; G08G 5/0034; G08G 5/0047; G01C 23/00
See application file for complete search history.

(56) References Cited

U.S. PATENT DOCUMENTS

| | | |
|---|---|---|
| RE31,159 E | 2/1983 | Sicre |
| 5,978,715 A | 11/1999 | Briffe et al. |
| 6,057,786 A | 5/2000 | Briffe et al. |
| 6,262,674 B1 | 7/2001 | Wyatt |
| 6,469,640 B2 | 10/2002 | Wyatt |
| 6,507,782 B1 | 1/2003 | Rumbo et al. |
| 6,870,490 B2 | 3/2005 | Sherry et al. |

(Continued)

FOREIGN PATENT DOCUMENTS

| | | |
|---|---|---|
| EP | 1462767 A1 | 9/2004 |
| EP | 3454016 A1 | 3/2019 |

OTHER PUBLICATIONS

Lambregts, Tony, et al., "A New Ecological Primary Flight Display Concept," https://ieeexplore.ieee.org/document/4702820?arnumber=4702820, Oct. 30, 2008.

(Continued)

*Primary Examiner* — Hussein Elchanti
(74) *Attorney, Agent, or Firm* — Lorenz & Kopf, LLP

(57) ABSTRACT

Technologically improved flight guidance systems and methods that generate thrust guidance related to a potential flight path angle are provided. The thrust guidance is provided as acceleration commands that may be communicated to the pilot in an intuitive manner, such as with an acceleration cue on a primary flight display (PFD) system. The provided acceleration cues are uniform across the flight envelope and present consistently for two basic thrust guidance modes.

20 Claims, 6 Drawing Sheets

(56) References Cited

U.S. PATENT DOCUMENTS

| | | | |
|---|---|---|---|
| 7,383,104 B2* | 6/2008 | Ishii | G01C 21/32 244/1 N |
| 7,611,098 B2 | 11/2009 | Van Boven | |
| 7,783,393 B2 | 8/2010 | Tucker et al. | |
| 8,234,068 B1 | 7/2012 | Young et al. | |
| 9,026,275 B1* | 5/2015 | Young | G08G 5/0052 701/3 |
| 9,233,762 B2 | 1/2016 | Louise et al. | |
| 9,561,860 B2 | 2/2017 | Knapp et al. | |
| 9,856,032 B2 | 1/2018 | Lissajoux et al. | |
| 10,005,561 B2 | 6/2018 | Kiebles et al. | |
| 2011/0046818 A1* | 2/2011 | Herkes | G08G 5/0017 701/3 |
| 2011/0066411 A1* | 3/2011 | Morio | G01H 17/00 703/2 |
| 2011/0118908 A1* | 5/2011 | Boorman | G08G 5/0052 701/14 |
| 2013/0218374 A1* | 8/2013 | Lacko | G08G 5/025 701/16 |
| 2014/0365041 A1 | 12/2014 | Decker et al. | |
| 2017/0168658 A1* | 6/2017 | Lacko | G01C 23/005 |
| 2018/0156633 A1 | 6/2018 | Fadden et al. | |

OTHER PUBLICATIONS

Anonymous: "Hexagram—Wikipedia", Jul. 4, 2017 (Jul. 4, 2017), XP55686962, Retrieved from the Internet: URL: https://en.wikipedia.org/w/indes.php? title=Hexagram&oldid=788885406 [retrieved on Apr. 17, 2020].

* cited by examiner ion No. 62/781,785, filed Dec. 19, 2018.
SYSTEMS AND METHODS FOR PROVIDING THRUST GUIDANCE RELATED TO FLIGHT PATH ANGLE

CROSS-REFERENCE TO RELATED APPLICATION

This application claims the benefit of U.S. Provisional Application No. 62/781,785, filed Dec. 19, 2018.

TECHNICAL FIELD

The present invention generally relates to vehicle guidance systems, and more particularly relates to flight guidance systems and methods for providing thrust guidance related to flight path angle.

BACKGROUND

Primary Flight Displays (PFDs) are flight-path centric and allow easy recognition of whether an aircraft is climbing or descending (i.e., its trajectory). In order to change the trajectory, a thrust level for the aircraft may need to be changed from a current thrust to a target thrust. In these scenarios a pilot may desire thrust guidance, and specifically, may desire acceleration commands to obtain the target thrust.

In automatic flight control systems (AFCS) that include both autopilot (AP) and auto-throttle (A/T) speed-control functions, there are two basic methods for controlling thrust, these are called thrust guidance modes, and include: speed control, and thrust control. Therefore, when a pilot desires thrust guidance, the pilot may further desire to receive thrust guidance that is presented in the same manner, regardless of which of the two thrust guidance modes are being used.

Additionally, although some flight guidance systems and methods provide thrust cues, the cues are generally in terms of engine power, engine power error, or throttle position error, therefore, not particularly intuitive, and not providing an indication of the acceleration that this represents. Some other common flight guidance systems provide a translation of engine power commands into an equivalent acceleration, but these implementations often deliver varying acceleration translations across a given flight envelope. Moreover, most systems present thrust acceleration cues that are very different from each other depending on which of the two thrust guidance modes they are for.

Accordingly, technologically improved flight guidance systems and methods that provide consistent thrust guidance acceleration commands for the basic thrust guidance modes are desired. The desirable systems and methods generate acceleration commands for thrust guidance that may be communicated to the pilot in an intuitive manner, such as with a cue on a primary flight display system. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a processor-implemented method for providing thrust guidance on a primary flight display (PFD) of an aircraft, is provided. The method includes: receiving an intended airspeed; receiving, from a source of state data, a current airspeed and a current flight path angle (FPA); receiving, from a source of avionics data, real time engine thrust (T) level, real time throttle level angle (TLA), and real-time weight; at a control module comprising a thrust director algorithm, executing the thrust director algorithm to thereby perform the operations of, referencing aircraft constraint data to obtain a $T_{max}$ and $T_{idle}$; calculating a projected potential flight path angle for the real time TLA ($PPFPA_{TLA}$) at $T_{max}$ as a function of the weight and the maximum TLA; calculating a $PPFPA_{TLA}$ at $T_{idle}$ as a function of the weight and the minimum TLA; generating an acceleration command ($PFPA_{CMD}$) as a function of the $PPFPA_{TLA}$ at $T_{max}$ and $PPFPA_{TLA}$ at $T_{idle}$; and commanding the PFD to render symbology representing the acceleration command.

Also provided is a system for providing thrust guidance on a primary flight display (PFD) of an aircraft, including: a source of an intended airspeed; a source of state data, providing a current airspeed and a current flight path angle (FPA); a source of avionics data, providing real time engine thrust (T) level, real time throttle level angle (TLA), and real-time weight; and a control module comprising a processor programmed to: reference aircraft constraint data to obtain a $T_{max}$ and $T_{idle}$; calculate a projected potential flight path angle for the real time TLA ($PPFPA_{TLA}$) at $T_{max}$ as a function of the weight and the maximum TLA; calculate a $PPFPA_{TLA}$ at $T_{idle}$ as a function of the weight and the minimum TLA; generate an acceleration command ($PFPA_{CMD}$) as a function of the $PPFPA_{TLA}$ at $T_{max}$ and $PPFPA_{TLA}$ at $T_{idle}$; and command the PFD to render symbology representing the acceleration command.

An embodiment of an aircraft is provided, including: a primary flight display (PFD); a source of an intended airspeed; a source of state data, providing a current airspeed and a current flight path angle (FPA); a source of avionics data, providing real time engine thrust (T) level, real time throttle level angle (TLA), and real-time weight; and a thrust director control module, comprising a processor programmed to: determine a true airspeed error; convert the true airspeed error into a desired acceleration command; acceleration limit the desired acceleration command with constraint data, creating an acceleration output, wherein the constraint data provides a $T_{max}$ and a $T_{idle}$; calculate a projected potential flight path angle for the real time TLA ($PPFPA_{TLA}$) at $T_{max}$ as a function of the weight and the maximum TLA; calculate a $PPFPA_{TLA}$ at $T_{idle}$ as a function of the weight and the minimum TLA; generate an acceleration command ($PFPA_{CMD}$) as a function of the $PPFPA_{TLA}$ at $T_{max}$ and $PPFPA_{TLA}$ at $T_{idle}$; and command the PFD to render symbology representing the acceleration command.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

Figure 1:
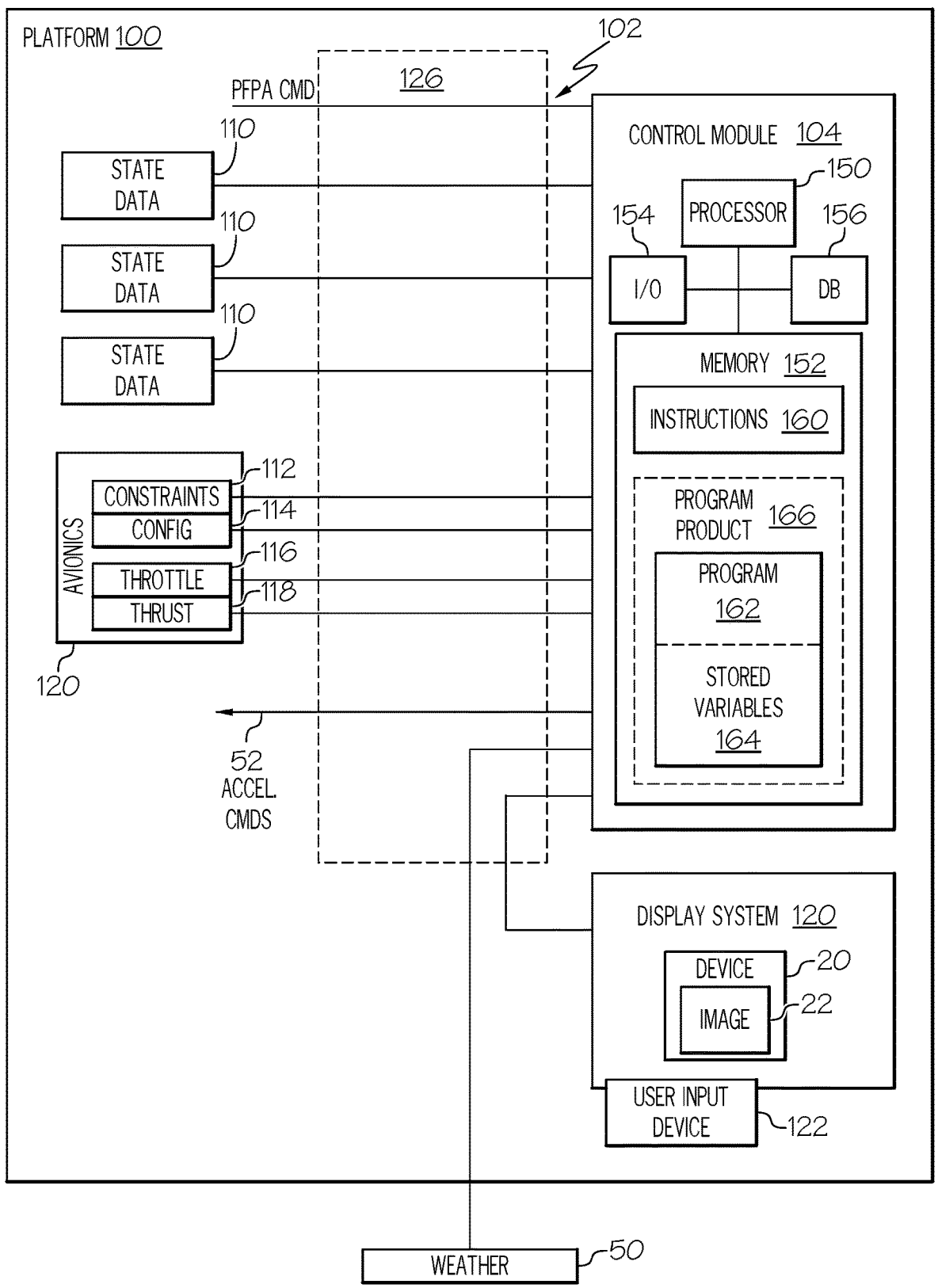
FIG. 1 is a block diagram of a thrust director system, in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

Exemplary embodiments of a disclosed thrust director module (FIG. 1, 104, also referred to below as control module 104) employ a novel thrust director algorithm to thereby deliver an enhanced flight guidance system that generates novel acceleration commands for thrust guidance. The novel thrust director algorithm, implemented as a method and system, utilizes aircraft potential flight path angles (PFPA), thrust (T), throttle level angles (TLA), and weight (W) to generate acceleration commands and to further realize a new "thrust director cue" for a primary flight display. Functionally, the new thrust director cue reveals to the pilot some of the interconnecting relationships between thrust level, throttle level angle, weight, airspeed, flight path angle, and acceleration. In the described embodiments, the thrust director algorithm is applied in the context of a Primary Flight Display (PFD) providing legacy flight path vector and legacy Flight Path Angle (FPA) Symbols. Although the thrust director algorithm is generally realized as an enhanced aircraft flight deck display system within an aircraft, the concepts presented here can be deployed in a variety of mobile platforms, such as rotorcraft, spacecraft, and the like. Additionally, the provided system and method may be separate from, or integrated within, a preexisting mobile platform management system, electronic flight information system (EFIS) or aircraft flight control system (AFCS).

As an overview, the novel rules and instructions constituting the thrust director algorithm (program 162 plus stored variables 164) generate an acceleration command that is uniform and related to equivalent flight path angle (FPA). The generated acceleration command may be a function of either speed error or thrust error and is not reliant upon potentially inconsistent drag values. In various embodiments, the generated acceleration command is rendered as a symbol on a display unit in a cockpit display; the symbol objectively providing additional information in an intuitive manner, thereby improving the human-machine interface. The thrust director algorithm additionally limits the generated acceleration commands to those that the available energy of the aircraft can support. Therefore, the acceleration guidance produced by executing the novel thrust director algorithm increases situational awareness of the crew, particularly with respect to the aircraft's current acceleration capability.

Turning now to FIG. 1, in an embodiment, the thrust director system 102 (also referred to herein as "system" 102) is generally associated with a mobile platform 100. In various embodiments, the mobile platform 100 is an aircraft, and is referred to as aircraft 100. The system 102 embodies a control module 104. Although the control module 104 is shown as an independent functional block, onboard the aircraft 100, in some embodiments, the control module 104 is integrated within a preexisting mobile platform management system, avionics system, cockpit display system (CDS), flight controls system (FCS), or aircraft flight management system (FMS). In some embodiments, the control module 104, user input device 122, and display system 120 are configured as a control display unit (CDU). In other embodiments, the control module 104 may exist in an electronic flight bag (EFB) or portable electronic device (PED), such as a tablet, cellular phone, or the like. In embodiments in which the control module is within an EFB or a PED, the display system 120 and user input device 122 may also be part of the EFB or PED.

The control module 104 may be operationally coupled to any combination of the following aircraft systems, which are generally on-board systems: an autopilot system (AP) 106; a source of an intended speed 108; a source of real time (RT) aircraft state data 110; a source of aircraft constraints 112; a source of aircraft configuration data 114, including sensor information and pre-programmed information (equipment settings and weight); a source of a throttle 116 setting; a source of a thrust level 118 setting; a display system 120; and, a user input device 122. In various embodiments, a communication system and fabric 126 may reside onboard and serve to communicatively couple various on-board systems and external sources, such as a source of weather data 50, to the control module 104. The functions of these aircraft systems, and their interaction, are described in more detail below.

In an embodiment, the intended speed 108 is calibrated airspeed. In an embodiment, the intended speed 108 is Mach speed. In various embodiments, the intended speed 108 may be manually provided via a user input device 122. In other embodiments, the intended speed 108 may be provided by a flight management system (FMS), in communication with a navigation database. The intended speed 108 may be obtained from a pre-programmed flight plan; in various embodiments, a flight plan provides an intended speed at each of a series of intended geospatial midpoints between a takeoff and a landing, and may further include intended performance data associated with each of the geospatial midpoints (non-limiting examples of the performance data include intended navigation data, such as: intended airspeed, intended altitude, intended acceleration, intended flight path angle, and the like).

Real time (RT) aircraft state data generally refers to navigation system data and inertial data. In some embodiments, the source of RT aircraft state data 110 may be a navigation system, and aircraft state data is sometimes referred to as navigation data. As used herein, "real-time" is interchangeable with current, instantaneous, and actual (as opposed to intended). RT aircraft state data may include any of: an instantaneous location (e.g., the latitude, longitude, orientation, attitude), an instantaneous track (i.e., the direction the aircraft is traveling in relative to some reference), a RT flight path angle, a RT vertical speed, a RT ground speed, a RT instantaneous altitude (or height above ground level), and a current phase of flight of the aircraft 100. In various embodiments, the source of aircraft state data 110 may include each of: an aircraft data system (ADS), a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. In various embodiments, the RT aircraft state data is made available by way of the communication system and fabric 126, so other components, such as the control module 104 and the display system 120, may further process and/or handle the aircraft state data.

Avionics status 124 data generally includes data that is specific to components and systems of aircraft 100, such as may be provided by sensors and/or equipment specifications. In an embodiment, avionics status data may be organized as constraints 112, configurations 114, throttle 116, and thrust 118. In an embodiment, constraints 112 may include a pre-programmed starting weight for the aircraft 100. In an embodiment, constraints 112 may control onboard systems to provide comfort during flight. In an embodiment, constraints 112 may include look up tables; in an embodiment, constraints 112 may further include an aircraft/engine-specific look up table that associates an engine thrust (T) level with each throttle level angle (TLA) setting or position from a minimum TLA to a maximum TLA. For example, in the T vs. TLA graph 200 shown in FIG. 2, it can be observed that at the lowest TLA 202, there is an associated minimum thrust, $T_{idle}$ 204, and the T is fairly flat as TLA increases to TLA 206. From TLA 206 to TLA 208, there is a steeper and more nearly linear positive relationship between TLA and engine thrust, T. After TLA 208, the T flattens again, approaching a maximum ($T_{max}$) as TLA continues to increase to its maximum. As can be appreciated, the T versus TLA graph 200 will vary for different aircraft and engines. In an aircraft-specific storage, such as constraints 112, the information embodied in the T versus TLA graph may be stored as a look-up table.

Returning to FIG. 1, configurations 114 may represent current (real-time) sensed component and system information and/or status for each of various on-board avionics systems; specific to this disclosure, RT aircraft configuration data collectively includes a current weight (W), status of aircraft flaps, landing gear position, status of spoilers, status of air brakes, status of flaps, etc.

Although throttle and thrust may be considered part of configurations 114, for the examples herein, we separate them out. Throttle 116 settings provides a current (real-time) sensed throttle level angle (TLA) setting. Thrust 118 settings provides a current (real-time) sensed thrust (T) level, generally in a range from idle to maximum. As mentioned in connection with FIG. 2, there's a relationship between T and TLA, but it may not be not linear.

During operation, the components of avionics status data self-report or provide respective real-time (RT) performance data and sensed data for further processing. Therefore, at least the thrust (T) level, weight (W), and throttle level angle (TLA) setting, are continually updated for further processing.

A source of weather data 50 provides current weather conditions. Some weather conditions, such as wind, effect airspeed, and are utilized by the control module 104.

In various embodiments, communication between aircraft 100 subsystems is managed by a communication system and fabric 126. The communication system and fabric 126 is configured to support instantaneous (i.e., real time or current) communications between onboard systems (i.e., the navigation system, the navigation database, the various avionics systems, the FMS), the control module 104, and one or more external data source(s) 122. As a functional block, the communication system and fabric 126 may represent one or more transmitters, receivers, and the supporting communications hardware and software required for components of the system 102 to communicate as described herein. In various embodiments, the communication system and fabric 126 may have additional communications not directly relied upon herein, such as bidirectional pilot-to-ATC (air traffic control) communications via a datalink; support for an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In various embodiments, the control module 104 and communication system and fabric 126 also support controller pilot data link communications (CPDLC), such as through an aircraft communication addressing and reporting system (ACARS) router; in various embodiments, this feature may be referred to as a communications management unit (CMU) or communications management function (CMF). In summary, the communication system and fabric 126 may allow the aircraft 100 and the control module 104 to receive information that would otherwise be unavailable to the pilot and/or co-pilot using only the onboard systems.

The user input device 122 and the control module 104 are cooperatively configured to allow a user (e.g., a pilot, co-pilot, or crew member) to interact with display devices 20 in the display system 120 and/or other elements of the system 102, as described in greater detail below. Depending on the embodiment, the user input device 122 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 122 is configured as a touchpad or touchscreen, it may be integrated with the display system 120. As used herein, the user input device 122 may be used to modify or upload the program product 166, override the program when it's running, etc. In various embodiments, the display system 120 and user input device 122 are onboard the aircraft 100 and are also operationally coupled to the communication system and fabric 126.

In various embodiments, the control module 104, alone, or as part of a central management computer (CMS) or a flight management system (FMS), loads instructions 160 to thereby be programmed with instructions 160. The control module executes instructions 160 and thereby draws upon input data and information to provide real-time flight guidance for aircraft 100. The real time flight guidance may be provided to a user by way of graphics and commands for the display system 120, an audio system, or the like. For example, the control module 104 may compare an instantaneous (current) position and heading of the aircraft 100 with the prescribed or intended flight plan data for the aircraft 100 and generate display commands to render images 22 distinguishing these features. The control module 104 may further associate a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like) with the instantaneous position and heading of the aircraft 100 and/or with the weather data 50.

The control module 104 generates display commands for the display system 120 to cause the display device 20 to render thereon the image 22, comprising various graphical user interface elements, tables, icons, alerts, menus, buttons, and pictorial images, as described herein. The display system 120 is configured to continuously receive and process the display commands from the control module 104. The display system 120 includes a display device 20 for presenting an image 22. In various embodiments described herein, the display system 120 includes a synthetic vision system (SVS), and the image 22 is an SVS image. In exemplary embodiments, the display device 20 is realized on one or more electronic display devices configured as any combination of: a head up display (HUD), an alphanumeric display, a vertical situation display (VSD) and a lateral navigation display (ND). In various embodiments, the display system 120 includes a primary flight display (PFD).

Renderings on the display system 120 may be processed by a graphics system, components of which may be integrated into the display system 120 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. The control module 104 may be said to display various images and selectable options described herein. In practice, this may mean that the control module 104 generates display commands, and, responsive to receiving the display commands from the control module 104, the display system 120 displays, renders, or otherwise visually conveys on the display device 20, the graphical images associated with operation of the aircraft 100, and specifically, the thrust guidance symbol and graphical images as directed by the control module 104.

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 functionality may be implemented or realized using a general purpose processor (shared, dedicated, or group) controller, microprocessor, or microcontroller that executes one or more software or firmware programs stored or programmed into a memory device; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as an enhanced computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Information in the memory 152 may be organized and/or imported from an external data source during an initialization step of a process; it may also be programmed via a user input device 122. In some embodiments, the database 156 is part of the memory 152. In some embodiments, instructions 160, program 162, and stored variables 164 are pre-loaded into the memory 152 or the database 156, and are, therefore, internal to the control module 104.

The program 162 includes previously described thrust director algorithm, comprising rules and instructions which, when executed, convert the processor 150/memory 152/database 156 configuration into the control module 104 that performs the functions, techniques, and processing tasks attributed to the operation of the system 102. Novel program 162 and associated stored variables 164 may be stored in a functional form on computer readable media, for example, as depicted, in memory 152. While the depicted exemplary embodiment is described in the context of a fully functioning computer system, those skilled in the art will recognize that the mechanisms of the present disclosure are capable of being distributed as a program product 166. As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 126. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 126 and obtains data from external data source(s) directly. Also, in various embodiments, the I/O interface 154 may support communication with technicians, and/or one or more storage interfaces for direct connection to storage apparatuses, such as the database 156.

As mentioned, Primary Flight Displays (PFDs) promote easy recognition of whether the aircraft is climbing or descending. When a FPA cue position is above the horizon, the aircraft is climbing, and when the FPA cue position is below the horizon, the aircraft is descending. The addition of a Potential Flight Path Angle (PFPA) cue to the PFD, as disclosed in Wyatt, et al, U.S. patent application Publication Ser. No. 15/700,416, "AUTOMATIC FLIGHT CONTROL SYSTEMS AND METHODS") has improved a pilot's recognition of the aircraft's current energy state. PFPA cue above/below the FPA cue indicates that the aircraft is accelerating/decelerating along its current flight path or trajectory.

Figure 2:
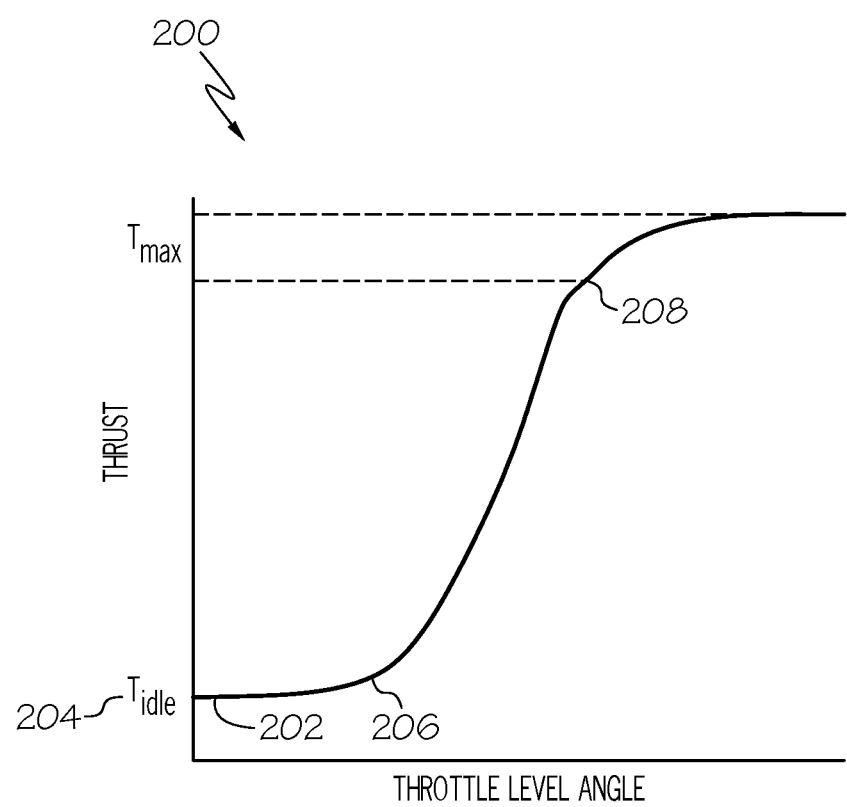
FIG. 2 is an example thrust versus throttle level constraint diagram, in accordance with an exemplary embodiment.
Figure 3:
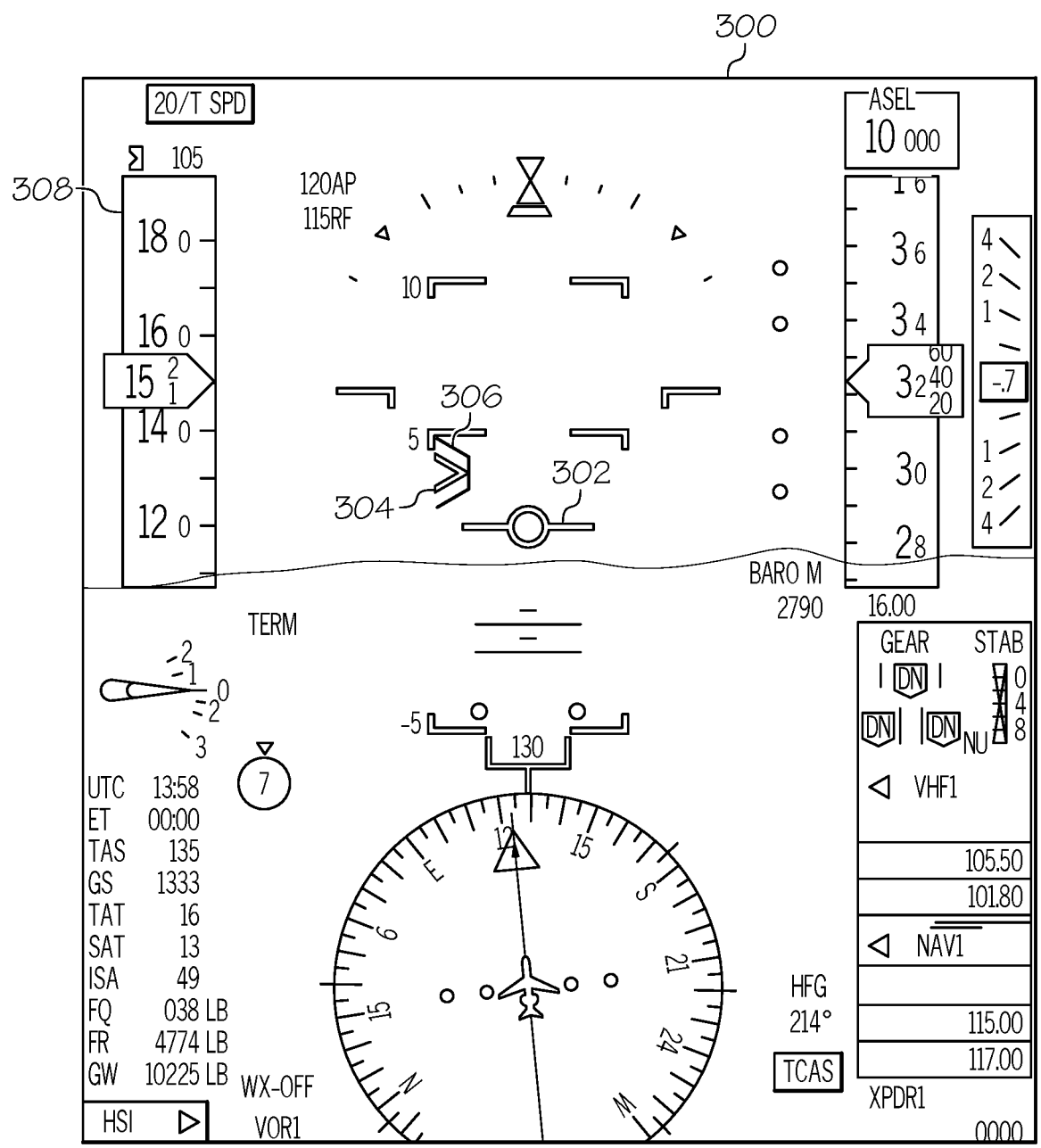
FIG. 3 is a PFD image generated by the thrust director system of FIG. 1, in accordance with an exemplary embodiment.

The novel thrust guidance algorithm, providing enhanced features, converts a flight guidance system into an enhanced flight guidance system having technological improvements over conventional flight guidance systems with at least these features: generation of a single acceleration command (PFPA$_{cmd}$ 52) for thrust guidance, T, that is the same for both thrust guidance modes; and rendering of unique and visually distinguishable symbology representing the acceleration command (the thrust director cue 306, FIG. 3, described below, scaled to a potential flight path angle (PFPA)). During operation, the processor 150 loads and executes one or more programs, algorithms and rules embodied as instructions and applications 160 contained within the memory 152 and, as such, controls the general operation of the control module 104 as well as the system 102. With specific reference to the processes and tasks described herein, the processor 150 loads the program 162, thereby being uniquely programmed with the novel thrust director algorithm. Moving now to FIGS. 3-5, and with continuing reference to FIGS. 1-2, operation and performance of the thrust director system 102 are described.

In FIG. 3, a primary flight display (PFD) 300 is illustrated having a flight path angle cue (FPA) 302. In various embodiments, a Potential Flight Path Angle (PFPA) 304 cue represents a flight path angle that could be maintained at the current airspeed. Speed tape 308 is vertical on the left side. As mentioned, the thrust director control module 104 generates acceleration commands PFPA$_{cmd}$ 52 and an associated thrust director cue 306. In various embodiments, and as depicted in FIG. 3, the thrust director cue 306 is shaped as half of a hexagram, i.e., 3 contiguous sides of a hexagram, scaled to the same units as the PFPA cue 304 (the middle portion of the hexagram being vertical). As depicted in FIG. 3, the PFPA cue 304 is slightly enveloped by the thrust director cue 306, which is open to the left: the first and third side of the thrust director cue 306 being angled toward the PFPA cue 304 and slightly enveloping the PFPA cue 304); the thrust director cue 306 is aligned on the same lateral axis as the PFPA cue 304. In other embodiments, the thrust director cue 306 may have other shapes. It is understood that the control module 104 continually calculates a current acceleration ($A_{FPA}$) as a function of the current speed at the trajectory, or flight path angle (FPA) of the aircraft 100.

The Potential Flight Path Angle (PFPA) 304 represents the flight path angle that could be maintained at the current airspeed. It can be defined, using small angle approximation, as shown in Eq. 1, below:

$$PFPA = FPA + \left(\frac{180}{\pi}\right)\frac{a_{FPA}}{g} \quad (1)$$

Where FPA 302 is the Flight Path Angle of the aircraft, $a_{FPA}$ is the acceleration along the flight path angle (also referred to as trajectory and as a flight path vector), and g is the acceleration due to gravity. Notice that acceleration is the only variable for a given FPA 302, and that a current acceleration ($a_{FPA}$ current) plugged into Equation 1 yields a current PFPA 304. Since the difference between the PFPA and the aircraft's fight path represents current acceleration/deceleration, this indicator provides a simple frame of reference to the pilot to manually control the aircraft's airspeed or move the aircraft to a desired airspeed at a predetermined acceleration/deceleration.

As mentioned, there are two basic thrust guidance modes:
Speed control mode; in which guidance is provided to maintain the aircraft at an airspeed target.
Thrust control mode; in which guidance is provided to maintain the aircraft at a fixed engine thrust (based on an engine rating and performance value), and the AFCS controls the aircraft speed.

Advantageously, the novel thrust director algorithm provides the same PFPA$_{cmd}$ 52 and thrust director cue 306 for each of these cases, regardless of which of the two thrust guidance modes are being used. Additionally, the thrust director algorithm performs unique acceleration limiting techniques so that the provided PFPA$_{cmd}$ 52 and thrust director cue 206 are assured to be achievable, given the current engine, its current maximum and minimum throttle level angles, and with the current aircraft configuration. Acceleration limiting is performed by the system 102 as follows.

With reference back to Equation 1, the PFPA is defined as the current FPA plus the acceleration/deceleration along the current flight path. The PFPA 304 can also be defined using the small angle approximation and thrust (T) and drag (D), as shown in Equation 2, below:

$$PFPA = FPA + \left(\frac{180}{\pi}\right)\frac{a_{FPA}}{g} = \left(\frac{180}{\pi}\right)\frac{T-D}{W} \quad (2)$$

Wherein T denotes the thrust at the current throttle level angle (TLA), D is the current drag of the aircraft, and W is the current weight of the aircraft. Solving this side of equation 2, requires that T and D can be obtained at the current aircraft configuration.

As mentioned, for a given FPA 302, the acceleration can be a variable with a range. To obtain the acceleration $a_{FPA}$ range limits of the aircraft 100 at a given FPA 302, the potential flight path angle needs to be projected using the T limits of the aircraft 100 which are constraints of the engine. The projected potential flight path angle for a given TLA is denoted PPFPA$_{TLA}$. Said differently, for any given throttle level angle (TLA), the projected potential flight path angle (PPFPA$_{TLA}$) can be computed as in Equation 3.

$$PPFPA_{TLA} = \left(\frac{180}{\pi}\right)\frac{T_{TLA} - D_{Proj}}{W} \qquad (3)$$

In equation 3, the subscript "proj" is used to indicate a projected value. Where PPFPA$_{TLA}$ denotes the Projected Potential Flight Path Angle at the given throttle level angle, $T_{TLA}$, denotes the thrust at the given throttle level angle, $D_{Proj}$ denotes the projected drag acting on the aircraft once the $T_{TLA}$ is achieved, and W is the aircraft weight.

As mentioned, T can be easily projected across the throttle quadrant, e.g., to obtain $T_{max}$ and $T_{idle}$, using look-up tables for the information shown in FIG. 2 (for example, this may be pre-programmed aircraft-specific data provided by an aircraft manufacturer). However, projecting drag D is more complicated and requires high-fidelity data from the aircraft manufacturer, which is not always available. This creates a technical problem in generating a drag D component that is meaningful. The novel thrust director algorithm solves this technical problem by deriving a computation of PPFPA$_{TLA}$ that does not require $D_{proj}$. To achieve this, Equation 3 is first written in the form shown in Equation 4, below:

$$PPFPA_{TLA} = \left(\frac{180}{\pi}\right) \qquad (4)$$
$$\left(\frac{T_{TLA\_Actual} + D_{Actual}}{W} + \left(\frac{T_{TLA\_proj} - D_{Proj}}{W} - \frac{T_{TLA\_Actual} - D_{Actual}}{W}\right)\right)$$

As used herein, the $T_{TLA\_Actual}$ is the current thrust T at the TLA, and the $D_{Actual}$ is the current drag. By using the relationship shown in Equation 2, we can rewrite the first term of the equation as shown in Equation 5, below:

$$PPFPA_{TLA} = PFPA + \left(\frac{180}{\pi}\right)\left(\frac{T_{TLA\_proj} - D_{Proj}}{W} - \frac{T_{TLA\_Actual} - D_{Actual}}{W}\right) \qquad (5)$$

In most operational scenarios, the error between $D_{proj}$ and $D_{Actual}$ is small and may be considered de minimus. In addition, as the aircraft's thrust (T) approaches the new, or commanded thrust, $T_{TLA}$, the error between $D_{proj}$ and $D_{Actual}$ reduces to substantially zero. Thus, we can approximate the PPFPA at a given TLA, without using a drag D component, as shown in Equation 6, below:

$$PPFPA_{TLA} \approx PFPA + \left(\frac{180}{\pi}\right)\left(\frac{T_{TLA\_proj} - T_{TLA\_Actual}}{W}\right) \qquad (6)$$

Therefore, using Equation 6, the novel thrust director algorithm estimates the PPFPA$_{TLA}$ at max thrust ($T_{max}$) by inserting $T_{max}$ for $T_{TLA\_proj}$ and estimates the PPFPA$_{TLA}$ at idle thrust ($T_{idle}$) by inserting $T_{idle}$ for $T_{TLA\_proj}$. In an embodiment, the estimated PPFPA$_{TLA}$ values represent achievable acceleration/deceleration limits (i.e., a maximum PPFPA$_{TLA}$ and minimum PPFPA$_{TLA}$) for the aircraft 100, given the current engine, its current maximum and minimum TLA, and current aircraft weight. In an embodiment, the estimated PPFPA$_{TLA}$ values represent achievable acceleration/deceleration limits (i.e., a maximum PPFPA$_{TLA}$ and minimum PPFPA$_{TLA}$) for the aircraft 100, given the current engine, its current maximum and minimum TLA, and current aircraft configuration.

The control module 104 comprising a thrust director algorithm executes the thrust director algorithm to thereby generate the PFPA$_{cmd}$ 52 and the associated thrust director cue 206 as a function of the estimated PPFPA$_{TLA}$ values. The calculations are done differently for speed control mode and for thrust control mode.

Figures 4, 5:
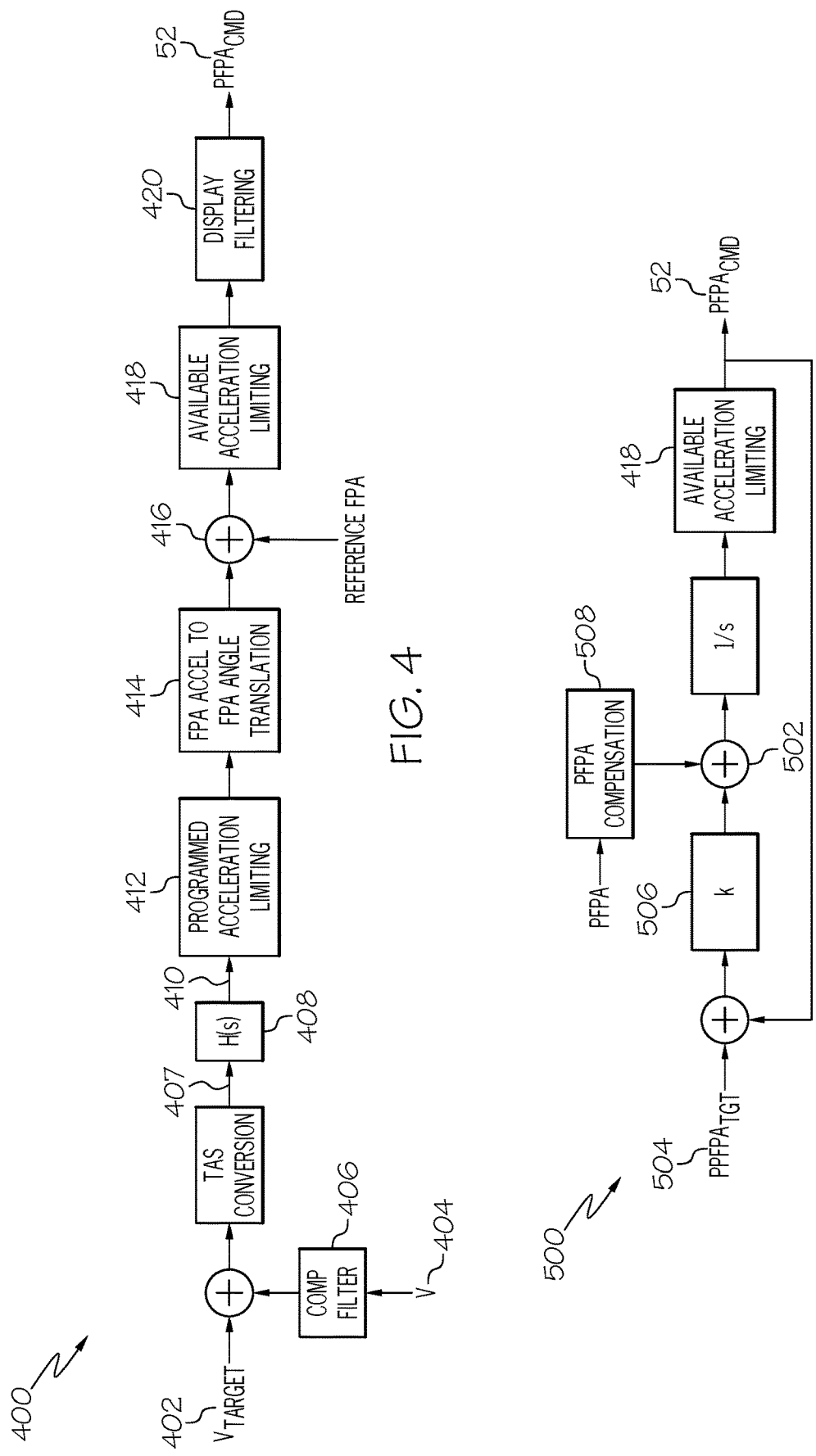
FIGS. 4 and 5 are data flow diagrams for a method for providing thrust guidance, in accordance with an exemplary embodiment.

For speed control modes, the system 102 employs a speed control scheme depicted in a data flow diagram 400 to generate a PFPA acceleration command PFPA$_{cmd}$ 52 that is a function of a speed error as shown in FIG. 4. The first step in the speed control scheme is computing the speed error between an intended speed, target speed V$_{target}$ 402, and an actual or real time speed V 404 (either in terms of calibrated airspeed or Mach number, responsive to a pilot selection) and converting the speed error to an equivalent true airspeed error 407. Actual or real time speed V 404 may be sourced from an air data system (ADS), IRS, or other avionics sensor system. Filtering 406 may be performed on the actual or real time speed V 404, determined based on available on-board sensors to provide appropriate noise rejection.

In process 408, the true airspeed error 407 is converted by the control module 104 into a desired acceleration command 410. Process 408 references aircraft specific constraints for a gain to process the true airspeed error 407 with. In an embodiment, the gain is a fixed value. In an embodiment, the gain is a function of: weight, center of gravity, and altitude. The output of process 408, desired acceleration command 410, is a delta acceleration per unit of speed error. The desired acceleration command 410 is input to an acceleration limiting process 412.

The acceleration limiting process 412 receives the desired acceleration command 410 and acceleration limits it with constraint data. In various embodiments, the constraint data used for acceleration limiting includes as aircraft weight, engine performance data, throttle level angle (TLA) minimum, throttle level angle (TLA) maximum, thrust at idle (T$_{idle}$), thrust at maximum (T$_{max}$), etc., to generate an output based thereon. In various embodiments, the constraint data includes a T vs TLA table; as mentioned with respect to FIG. 2, T versus TLA is not linear. Accordingly, the acceleration limiting process 412 acts as a pre-programmed acceleration limiter, because it references existing constraints rather than sensors. In various embodiments, the acceleration limiting process 412 may be any combination of the following: represent ease/comfort modifications (for example, for commercial flights in which passengers expect a smooth ride with gentle transitions), represent aircraft-specific or mission-specific requirements, come from a flight guidance system, and be uploaded and stored in memory 152, as part of the program 162 and stored variables 164. Depending on the embodiment, any one or more may apply: the acceleration limiting process 412 can be modified per application, can be modified to employ variable acceleration limiting at different parts of the speed envelope, and can be modified to employ variable acceleration limiting based on flight phase.

After the acceleration limiting process 412, which generates an acceleration output, the acceleration output is translated into a delta flight path angle (delta FPA) in process 414. In an operation 416, the control module 104 adds the delta FPA to a reference FPA to obtain an unlimited potential flight path command. The reference FPA can be determined based on a coupling status to the autopilot/autoflight system, and can be set to be one of: a FPA command from the autoflight system, a filtered FPA, or a raw FPA. The process 414 and operation 416 represent the implementation of Equation 1 above.

The output of operation 416 is subjected to real time available acceleration limiting in process 418. Process 418 utilizes the $PPFPA_{TLA}$ at max thrust ($T_{max}$) and $PPFPA_{TLA}$ at idle thrust ($T_{idle}$) described above (Equation 6), and performs acceleration limiting on them based on sensed current configuration 114. In an example, the real time available acceleration limiting in process 418 is needed when the aircraft's flight path angle plus the required thrust change requested by the thrust director exceeds the PPFPA; in this scenario, the PFPA command will be limited to the PPFPA.

The output of process 418 undergoes display filtering at 420, before the commands are issued and displayed on the PFD. The display filtering at 420 is directed to reducing jitter, improving the human-machine interface, and thereby improving the pilot handling quality of the displayed thrust director cue 306.

For thrust control mode, generally, a pilot will want to fly with an acceleration at a $PPFPA_{max}$ for a climb and at a $PPFPA_{min}$ for a descent. As shown in connection with FIG. 2, even if one could flip the TLA from minimum to maximum instantaneously, there would be a lag time observable in the speed of the transition for thrust T to respond thereto. The system 102 employs a thrust control scheme shown in data flow diagram, in which it generates a PPFPA of a target thrust ($PPFPA_{target}$ 504) and drives the PFPA acceleration command ($PFPA_{cmd}$ 52) to the computed $PPFPA_{target}$ 504. In various embodiments, the $PPFPA_{target}$ 504 is an acceleration output from process 412, described above.

At initialization of the thrust control mode shown in data flow diagram 500, an integrator 502 is initialized to the current PFPA 304 and driven to the target PPFPA, ($PPFPA_{target}$ 504) via a first order lag response (K 506) to allow the speed of the transition to be modified. The time constant K 506 is a variable. In various embodiments, K 506 is a function of each of flight condition, measured (i.e., actual, real-time, current) acceleration, or a similar condition. In addition, in case the aircraft 100 gets ahead of the $PFPA_{cmd}$ 52, as can occur when in non-coupled operation, climb-to-descent or descent-to-climb transitions, a PFPA compensation term 508 provides a mechanism to speed up the filter transient. As with speed control mode, the $PFPA_{cmd}$ 52 is bounded by the available acceleration (PPFPA limits per Equations 6 & 7) prior to being displayed.

Figure 6:
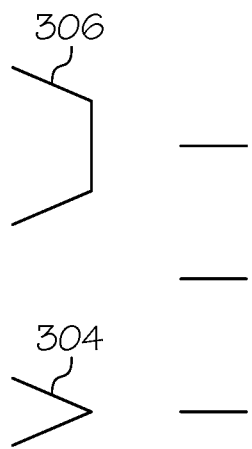
FIGS. 6 and 7 are illustrations of the relationship between the thrust director cue and the PFPA cue, in accordance with an exemplary embodiment.
Figure 7:
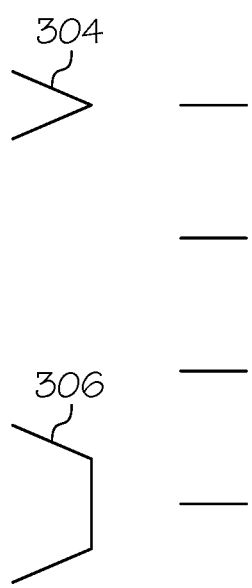

FIG. 6 and FIG. 7 illustrate what is visually communicated to a pilot by the new thrust director cue 306. In FIG. 6, the thrust director cue 306 is above the PFPA cue 304, which indicates that the thrust must be increased. In FIG. 7, the thrust director cue 306 is below the PFPA cue 304, which indicates that the thrust must be decreased. In FIG. 6 and FIG. 7, if the FPA 202 were depicted below the PFPA cue 204, the aircraft 100 is accelerating, as in FIG. 2; whereas, if the FPA 202 were depicted above the PFPA cue 204, the aircraft 100 is decelerating.

Figure 8:
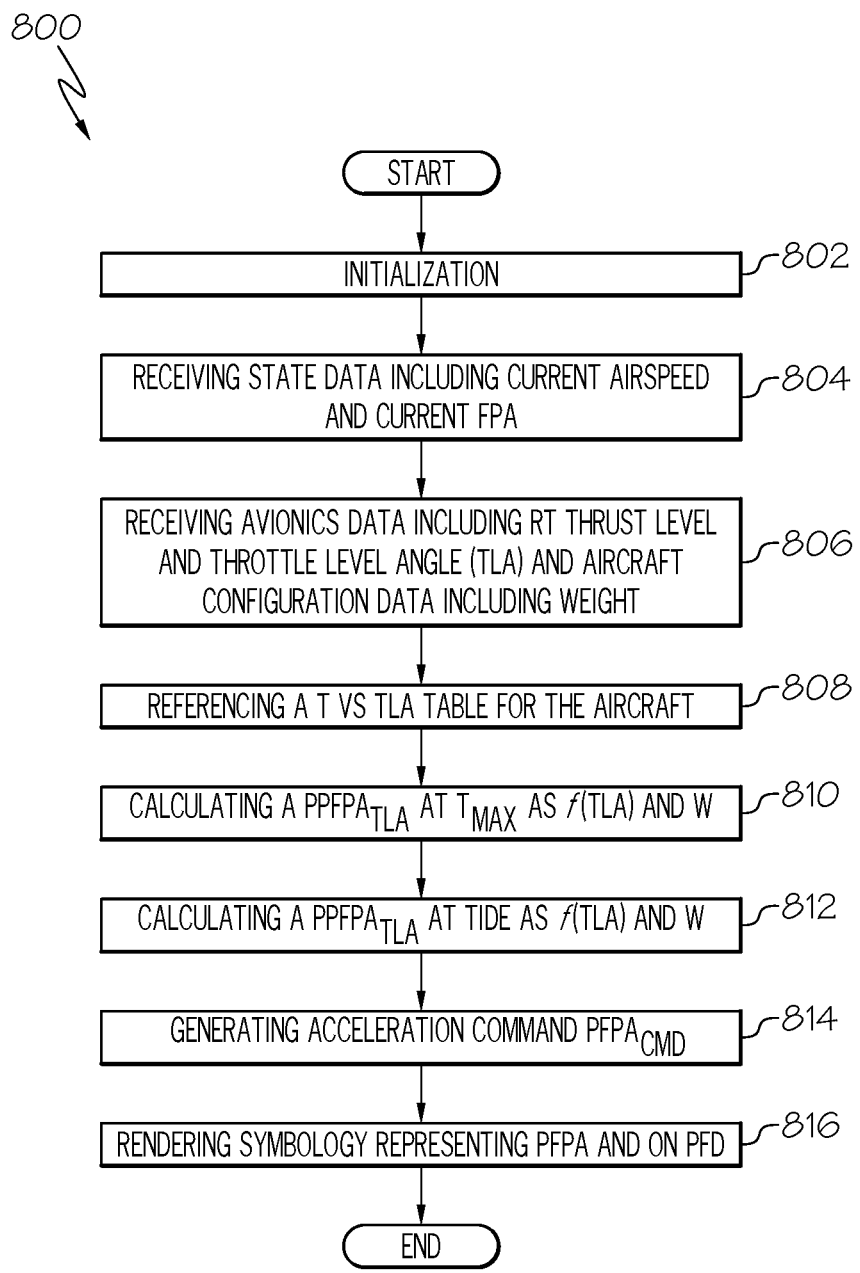
FIG. 8 depicts a method for providing thrust guidance on a primary flight display, in accordance with an exemplary embodiment.

Referring now to FIG. 8 and with continued reference to FIGS. 1-7, a flow chart is provided for a method 800 for providing thrust guidance, in accordance with various exemplary embodiments. For illustrative purposes, the following description of method 800 may refer to elements mentioned above in connection with FIGS. 1-7. In practice, portions of method 800 may be performed by different components of the described system. It should be appreciated that method 800 may include any number of additional or alternative tasks, the tasks shown in FIG. 8 need not be performed in the illustrated order, and method 800 may be incorporated into a more comprehensive procedure or method having additional functionality not described in detail herein. Moreover, one or more of the tasks shown in FIG. 8 could be omitted from an embodiment of the method 800 if the intended overall functionality remains intact.

The method starts, and at 802 the control module 104 is initialized. As mentioned above, initialization may comprise uploading or updating instructions and applications 160, program 162, stored variables 164, such as the T vs TLA look-up tables, and the like. Initialization at 802 may also include identifying weather information sources 50 and/or external signals and the communication protocols to use with each of them.

At 804, current aircraft state data is received, including at least current airspeed and current flight path angle (FPA). At 806, avionics data is received from one or more of the avionics 120 sources. In various embodiments, the avionics data includes constraints 112, configuration 114 information (including at least aircraft weight), throttle 116 level angle (TLA), and thrust 118 level (T).

At 808, an aircraft-specific and/or engine-specific Thrust versus Throttle Level Angle (T vs TLA) look-up table is consulted. This lookup table conveys the specific relationship between a throttle level angle and the associated engine thrust, and is generally non-linear.

At 810, a projected potential flight path angle for the real time TLA ($PPFPA_{TLA}$) at $T_{max}$ as a function of the weight and the maximum TLA is calculated. At 812, a $PPFPA_{TLA}$ at $T_{idle}$ as a function of the weight and the minimum TLA is calculated. These calculations are projections that are a function of the information in the T vs TLA look-up table, the aircraft weight, and a given real time TLA.

At 814, an acceleration command ($PFPA_{CMD}$) is generated as a function of the $PPFPA_{TLA}$ at $T_{max}$ and $PPFPA_{TLA}$ at $T_{idle}$. At 816, the method 800 renders symbology representing the $PFPA_{CMD}$ on a primary flight display, as described herein. After 816, the method 800 may end or return to 804.

It will be appreciated that the thrust director system 102 may differ from the embodiment depicted in FIG. 1. The thrust director system 102 may be integrated with an existing flight management system (FMS) Flight control system (FCS), or cockpit display in the aircraft 100.

Accordingly, the exemplary embodiments discussed above provide a method for implementing a novel Thrust Director algorithm that generates acceleration commands $PFPA_{cmd}$ 52 for all thrust guidance modes. These commands are then displayed on the same lateral axis as a potential flight path acceleration cue 204 on the Primary Flight Display. This Thrust Director algorithm also provides acceleration limiting of its commands based on the available energy of the aircraft at its present aircraft configuration. The acceleration limited $PFPA_{cmd}$ 52 schemes do not require drag to compute the acceleration limits, allowing deployment of the function into aircraft that do not have high-fidelity drag data available, as in the case of retro-fit applications. This Thrust Director method and system 102 will improve the pilot's ability to control the aircraft's speed in a non-coupled operation and increases the pilot awareness of the acceleration/deceleration available at the current aircraft configuration. In addition, this Thrust Director scheme can be used as the outer loop to an Auto-throttle to translate the flight path acceleration commands into desired throttle positions to achieve either automatic speed or thrust control.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented method for providing thrust guidance on a primary flight display (PFD) of an aircraft, the method comprising:
   receiving an intended airspeed;
   receiving, from a source of state data, a current airspeed and a current flight path angle (FPA);
   receiving, from a source of avionics data, real time engine thrust (T) level, real time throttle level angle (TLA), and real-time weight;
   at a control module comprising a thrust director algorithm, executing the thrust director algorithm to thereby perform the operations of,
      referencing aircraft constraint data to obtain a $T_{max}$ and $T_{idle}$, wherein $T_{max}$ is a maximum thrust and $T_{idle}$ is a thrust at idle;
      calculating a projected potential flight path angle for the real time TLA ($PPFPA_{TLA}$) at $T_{max}$ as a function of the weight and a maximum TLA;
      calculating a $PPFPA_{TLA}$ at $T_{idle}$ as a function of the weight and a minimum TLA;
      generating an acceleration command ($PFPA_{CMD}$) as a function of the $PPFPA_{TLA}$ at $T_{max}$ and $PPFPA_{TLA}$ at $T_{idle}$; and
      commanding the PFD to render symbology representing the acceleration command.

2. The method of claim 1, further comprising:
   determining a true airspeed error;
   converting the true airspeed error into a desired acceleration command; and
   wherein the desired acceleration command is acceleration limited with constraint data from a T versus TLA table.

3. The method of claim 2, wherein the constraint data further includes comfort modifications.

4. The method of claim 3, further including:
   receiving configuration data for the aircraft; and
   performing acceleration limiting on $PPFPA_{TLA}$ at $T_{max}$ and $PPFPA_{TLA}$ at $T_{idle}$ based on the configuration data.

5. The method of claim 4, further comprising, commanding the PFD to render symbology representing an FPA that could be maintained at the current airspeed.

6. The method of claim 5, further including: preforming display filtering before rendering the acceleration command.

7. The method of claim 6, wherein the symbology representing the acceleration command is a thrust director cue shaped as 3 contiguous sides of a hexagram, scaled to the same units as a PFPA cue.

8. A system for providing thrust guidance on a primary flight display (PFD) of an aircraft, comprising:
   a source of an intended airspeed;
   a source of state data, providing a current airspeed and a current flight path angle (FPA);
   a source of avionics data, providing real time engine thrust (T) level, real time throttle level angle (TLA), and real-time weight; and
   a control module comprising a processor programmed to:
      reference aircraft constraint data to obtain a $T_{max}$ and $T_{idle}$, wherein $T_{max}$ is a maximum thrust and $T_{idle}$ is a thrust at idle
      calculate a projected potential flight path angle for the real time TLA ($PPFPA_{TLA}$) at $T_{max}$ as a function of the weight and a maximum TLA;
      calculate a $PPFPA_{TLA}$ at $T_{idle}$ as a function of the weight and a minimum TLA;
      generate an acceleration command ($PFPA_{CMD}$) as a function of the $PPFPA_{TLA}$ at $T_{max}$ and $PPFPA_{TLA}$ at $T_{idle}$; and
      command the PFD to render symbology representing the acceleration command.

9. The system of claim 8, wherein the processor is further programmed to:
   determine a true airspeed error;
   convert the true airspeed error into a desired acceleration command; and
   wherein the desired acceleration command is acceleration limited with constraint data from a T versus TLA table, creating an acceleration output.

10. The system of claim 9, wherein the constraint data further includes comfort modifications.

11. The system of claim 10, wherein the processor is further programmed to:
   receive configuration data for the aircraft; and
   perform acceleration limiting on $PPFPA_{TLA}$ at $T_{max}$ and $PPFPA_{TLA}$ at $T_{idle}$ based on the configuration data.

12. The system of claim 11, wherein the processor is further programmed to command the PFD to render symbology representing a FPA that could be maintained at the current airspeed, referred to as a PFPA cue.

13. The system of claim 12, wherein the processor is further programmed to preform display filtering before rendering the acceleration command.

14. The system of claim 13, wherein the processor is further programmed to generate the symbology representing the acceleration command as a thrust director cue shaped as 3 contiguous sides of a hexagram, scaled to the same units as the PFPA cue.

15. The system of claim 14, wherein the processor is further programmed to:
   translate the acceleration output into a delta flight path angle (delta FPA);
   add the delta FPA to a reference FPA to obtain an unlimited potential flight path command; and
   use the unlimited potential flight path command in the generation of the acceleration command ($PFPA_{CMD}$).

16. An aircraft, comprising:
   a primary flight display (PFD);
   a source of an intended airspeed;
   a source of state data, providing a current airspeed and a current flight path angle (FPA);

a source of avionics data, providing real time engine thrust (T) level, real time throttle level angle (TLA), and real-time weight; and a thrust director control module, comprising a processor programmed to:
  determine a true airspeed error;
  convert the true airspeed error into a desired acceleration command;
  acceleration limit the desired acceleration command with constraint data, creating an acceleration output, wherein the constraint data provides a $T_{max}$ and a $T_{idle}$, wherein $T_{max}$ is a maximum thrust and $T_{idle}$ is a thrust at idle;
  calculate a projected potential flight path angle for the real time TLA ($PPFPA_{TLA}$) at $T_{max}$ as a function of the weight and a maximum TLA;
  calculate a $PPFPA_{TLA}$ at $T_{idle}$ as a function of the weight and a minimum TLA;
  generate an acceleration command ($PFPA_{CMD}$) as a function of the $PPFPA_{TLA}$ at $T_{max}$ and $PPFPA_{TLA}$ at $T_{idle}$; and
  command the PFD to render symbology representing the acceleration command.

17. The aircraft of claim 16, wherein the constraint data includes an engine-specific T versus TLA table.

18. The aircraft of claim 17, wherein the processor is further programmed to:
  receive configuration data for the aircraft; and
  perform acceleration limiting on $PPFPA_{TLA}$ at $T_{max}$ and $PPFPA_{TLA}$ at $T_{idle}$ based on the configuration data.

19. The aircraft of claim 18, wherein the processor is further programmed to:
  translate the acceleration output into a delta flight path angle (delta FPA);
  add the delta FPA to a reference FPA to obtain an unlimited potential flight path command; and
  use the unlimited potential flight path command in the generation of the acceleration command ($PFPA_{CMD}$).

20. The aircraft of claim 19, wherein the processor is further programmed to:
  command the PFD to render symbology representing an FPA that could be maintained at the current airspeed, referred to as a PFPA cue; and
  generate the symbology representing the acceleration command as a thrust director cue shaped as 3 contiguous sides of a hexagram, scaled to the same units as the PFPA cue.

* * * * *